Patented Mar. 7, 1950 2,500,142

UNITED STATES PATENT OFFICE 2,500,142

THIO-ETHER SUBSTITUTED THIAZOLES AND SELENAZOLES AND PROCESS OF PREPARING THE SAME

Gustav A. Wiesehahn, Binghamton, N. Y., assignor to General Aniline & Film Corporation, New York, N. Y., a corporation of Delaware No Drawing. Application April 24, 1947, Serial No. 743,737

12 Claims. (Cl. 260—302)

This invention relates to thio-ether substituted thiazoles and selenazoles, as intermediates for the preparation of sensitizing dyestuffs, and to a method of preparing said intermediates.

In the preparation of cyanine sensitizing dyes, a large variety of nitrogenous heterocyclic bases have been used in the form of their quaternary salts to obtain dyestuffs with varying degrees of sensitizing activity and sensitizing ranges. A wide choice of symmetrical and asymmetrical cyanine dyes can be made by a suitable choice of intermediates. Moreover, similar bases have been used to prepare merocyanine, hemicyanine and styryl dyes, which are also capable of sensitizing gelatino silver-handle emulsions.

The preparation of thioether and selenoether substituted benzothiazoles, and sensitizing dyes therefrom, is known. The method, in general, consists of diazotizing 6-amino-benzothiazole and reacting the diazonium compound with an alkali metal xanthogenate. The resulting xanthic acid ester is split into a thiophenol by means of alkali and the thiophenol alkylated. The introduction of the selenoalkyl group into the benzene ring may be effected by diazotizing a 6-amino-benzothiazole, reacting the diazonium compound with potassium selenocyanate, splitting the selenocyano compound by means of alkali, and alkylating the resulting selenophenol.

It is also known that the introduction of ethyl and phenyl thio-ether substituents into acetone by reacting chloroacetone with alkyl or phenyl sodium mercaptides, can be accomplished (Autenrieth, Ber. 24, 163–5, 1891).

Compounds of this type have been brominated by Delisle (Ann. 260, 266). The resultant monobromo derivative was isolated, but attempts to ascertain the position of the bromine atom in the derivative were unsuccessful.

It is an object of the present invention to provide thio-ether substituted thiazoles and selenazoles containing an ether group attached to the azole ring.

Another object of this invention is to provide a process of preparing such dye intermediates.

I have discovered that by heating a molecular equivalent of a halogenated ketonyl ether, thioether, or seleno-ether with a molecular equivalent of thiourea, selenourea, a thio-acylamide, or selenoacylamide, bases of ether, thio-ether, and seleno-ether substituted thiazoles, and selenazoles, respectively, are obtained. These bases, which for sake of brevity will be referred to hereinafter as ether substituted azoles, serve as intermediates in organic syntheses and in the preparation of cyanine, cyazine, hemicyanine, merocyanine, styryl, etc., type dyes.

The bases, prepared in accordance with this invention, have the following general formula:

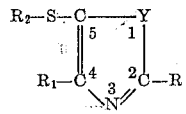

wherein R represents an amino group, an alkyl group, e. g., methyl, ethyl, propyl, butyl, isobutyl, amyl, hexyl, heptyl, octyl, octadecyl and the like, aryl, e. g., phenyl, diphenyl, tolyl, naphthyl, etc., aralkyl, e. g., benzyl, ethyl benzyl and the like, heterocyclic, e. g., pyridyl, furfuryl, thiazolyl, selenazolyl, quinolyl and the like, $R_1$ and $R_2$ represent an alkyl, aryl, aralkyl or heterocyclic group of the same value as R, and Y represents either sulfur or selenium.

The bases, which are numbered as shown in the above general formula, may be prepared by the following series of reactions:

1. $R_1COCH_2X + R_2SNa = R_1COCH_2SR_2 + NaX$

2. $R_1COCH_2SR_2 + 2X = R_1COCHXSR_2 + HX$

3. $R_2SCHXCOR_1 + RCYNH_2$

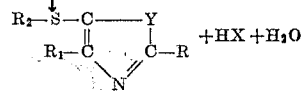

wherein R, $R_1$, $R_2$, and Y, have the same values as given above, and X represents chlorine, bromine, or iodine.

Reaction 1 has been described by Autenrieth for the preparation of thioethyl and thiophenyl acetone. Numerous other thioether-substituted ketones can be made in an analogous manner using chloroacetone, which Autenrieth employed, or chloro-methyl-ethyl ketone (described in Bull. Soc. Chim. France (3) 33, 325), phenacyl bromide, and other halogenomethyl-alkyl, -aryl, and -heterocyclic ketones can be used. As indicated above, the mercaptan in the form of a metal salt, such as the sodium, potassium, or silver salt, reacts with alkyl, aryl, or heterocyclic chloromethyl or chloroethyl ketone to give the corresponding thio-ether intermediate.

The following are examples of suitable alkyl, aryl, and heterocyclic chloromethyl ketones which may be reacted with a suitable mercaptan in the form of its silver, sodium or potassium salt:

(J. Biol. Chem. 77, 560)
$C_2H_5-CH_2-CO-CH_2Cl$
Chloromethyl propyl ketone (Ann. 408, 192)
$(CH_3)_2=CH-(CH_2)_3-CO-CH_2Br$
7-bromo-2-methyl heptanone-(6)

(Ber. 44, 2066)
$(CH_3)_3C-CO-CH_2Br$
4-bromo-2,2-dimethyl butanone-3

(Ber. 30, 578)
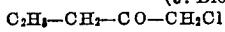
Chloromethyl-p-tolyl ketone (Ber. 30, 577)
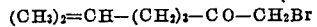
Bromomethyl p-tolyl ketone (Ber. 30, 1715)
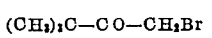
Chloromethyl p-methoxy-phenyl ketone (Ber. 31, 173)
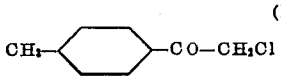
Bromomethyl p-methoxy-phenyl ketone (J. Chem. Soc. 95, 2119)
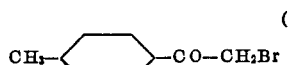
Chloromethyl p-acetoxy-phenyl ketone (Ber. 31, 170; J. Chem. Soc. 95, 2117)
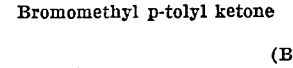
Chloromethyl p-hydroxy-phenyl ketone (Ber. 30, 1716)
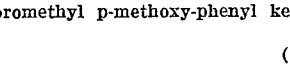
Chloromethyl o-methoxy-phenyl ketone (Ber. 30, 1080)
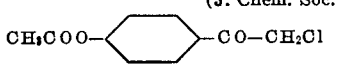
Bromomethyl o-acetoxy-phenyl ketone (Ber. 51, 911)
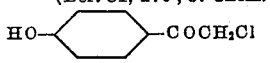
Chloromethyl 1-naphthyl ketone (Ann. 327, 97)
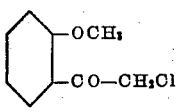
Chloromethyl-5-acenaphthyl ketone (Ber. 18, 540)
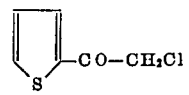
2-chloroacetyl thiophene (Ber. 19, 2891)
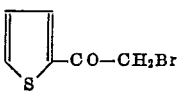
2-bromoacetyl thiophene (Ann. 312, 332)
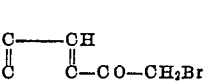
2-bromoacetyl furane

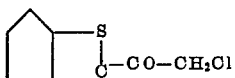
2-chloroacetyl benzothiazole

The following are examples of suitable aliphatic, aromatic, and heterocyclic sulfhydryls (mercaptans) and selenohydryls which react with the alkyl, aryl, and heterocyclic chloromethyl and chloroethyl ketones:

(Ber. 7, 1287)
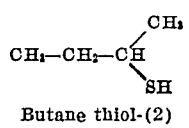
Butane thiol-(2)

(J. Chem. Soc. 57, 641)
$(CH_3)_3C-SH$
Tert.-Butyl mercaptan (Rec. trav. chim. Pays-Bas 24, 356)
$CH_3-(CH_2)_4-CH_2-SH$
Hexyl mercaptan (Ann. 83, 18)
$CH_3-(CH_2)_{14}-CH_2-SH$
Cetyl mercaptan (Ber. 39, 733)
$HS-CH_2-COOH$
Thioacetic acid (Monatsh. Chem. 18, 33)
$HOOC-CH$
$HOOC-C-SH$
Thiomaleic acid (Ber. 13, 386)
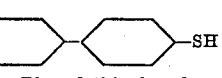
p-Phenyl thiophenol (Ber. 32, 1147)
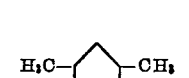
2,4-dimethyl phenyl mercaptan (Ber. 39, 3103)
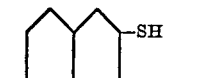
2-thionaphthol

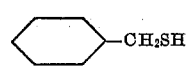
Benzyl mercaptan (Ann. 136, 75)

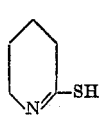
2-mercapto-pyridine (Ber. 33, 1556)

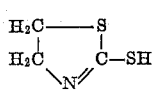
2-mercapto-thiozoline (Ber. 36, 1281)

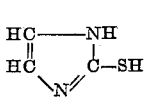
2-mercapto-imidazole (Ber. 25, 2359)

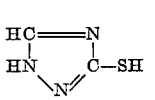
3-mercapto-1,2,4-triazole (Ber. 29, 2484)

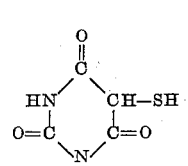
5-mercapto-barbituric acid (Ber. 16, 1060)

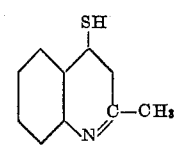
4-mercapto-quinaldine (Ber. 21, 1971)

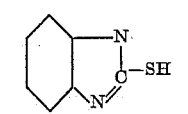
2-mercapto-benzimidazole (Ann. 221, 9)

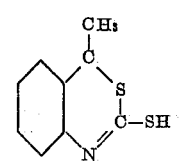
2-mercapto-6-methyl-4,5-benzo-1,3-thiazine (Ber. 27, 2430)

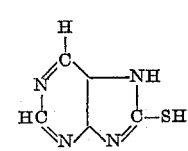
8-mercapto-purine (Ber. 39, 260)

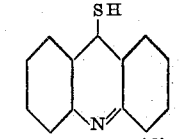
9-mercapto-acridine (J. pr. Chem. (2) 68, 88)

Reaction 2 is carried out by treating the ketonyl ether, thio-ether, or a seleno-ether intermediate with an equimolecular amount of a halogen, preferably bromine, in the presence of a solvent-diluent such as, chloroform, methylene chloride, etc.

In conducting Reaction 3 a molecular equivalent of the halogenated thio-ether is condensed with a molecular equivalent of a thioacylamide, selenoacylamide or thiourea or selenourea. This condensation reaction is hastened by heating on a steam bath and can be modulated by the addition of a diluent such as anhydrous alcohol, e. g., methyl, ethyl, propyl, isopropyl alcohol, and the like, or by the addition of an aromatic hydrocarbon such as benzene, toluene, m- or p-xylene, ethylbenzene, propyl benzene, etc.

As examples of suitable thioureas, selenoureas, thioacyl and selenoacylamides, the following may be mentioned:

(1) $H_2N-CS-NH_2$
Thiourea (2) $CH_3-NH-CS-NH_2$ (Ann. 265, 113)
N-methyl thiourea (3) $C_6H_5-CH_2-NH-CS-NH_2$ (J. Chem. Soc. 59, 552)
Benzyl thiourea (4) $C_2H_5-NH-CSe-NH_2$ (Ger. Patent 305,262)
N-ethyl selenourea (5) $C_6H_5-NH-CSe-NH_2$ (Ber. 19, 1579)
Phenyl selenourea (6) $H_2N-CSe-NH_2$
Selenourea (7) $C_6H_5-CS-NH_2$ (Ber. 23, 158)
Thiobenzamide (8) $C_{10}H_7-CS-NH_2$ (Ber. 21, 54)
Thio-α-naphthamide (9) $C_6H_5-CH_2-CS-NH_2$ (Ann. 184, 292)
Phenyl thioacetamide

(10) $CH_3CS-NH_2$
Thioacetamide

(11) $CH_3CH_2-CS-NH_2$
Thiopropionamide

(12) 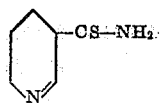
Nicotinic thioamide (Thionicotinamide)

(13) $CH_3-\overset{Se}{\underset{\parallel}{C}}-NH_2$ (J. A. C. S. 57, 2494)
Selenoacetamide

(14) $Se=C-NH_2$ (Ber. 7, 1273)
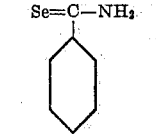
Selenobenzamide

During the reaction between the halogenated ketonyl thio-ether and the thiourea, selenourea, thioacylamide, etc., ring closure takes place with the elimination of hydrogen halide and water, as exemplified by Equation 3. The reaction mixture is cooled to room temperature and treated with dilute aqueous alkali such as sodium hydroxide, potassium hydroxide, sodium carbonate, etc. The thiazole or selenazole bases are recovered by extraction and subsequent removal of the solvent by distillation.

The sequence of the foregoing reactions can also be used to obtain such bases having an oxoether or selenoether substituent. Ethoxy-substituted thiazoles have previously been made by reaction acyl-α-amino acid esters with phosphorus pentasulfide (Chem. Abstr. 20, 2679 and 25, 1247).

The following examples describe in detail the methods for preparing the ether substituted azoles, but it is to be understood that they are merely illustrations and are not to be construed as limitative.

*Example I*

2,4-dimethyl-5-ethylmercapto thiazole

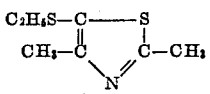
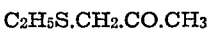

33 grams of ethylmercapto-acetone, $C_2H_5S.CH_2.CO.CH_3$ prepared in accordance with the method of Autenrieth, were dissolved in 60 cc. of chloroform. To this solution were added, at a temperature below 5° C., 45 grams of bromine diluted with 40 cc. of chloroform. The mixture was then washed with water, the solvent distilled off with the aid of a water pump. The residual oil was distilled twice at about 5 mm. pressure at 80–120° C., and 18.6 grams of a yellow to orange oil collected. On the addition of 7 grams thioacetamide heat developed. After 20 minutes of heating on the steam bath, 60 cc. of hydrochloric acid 1:2 were added, the solution boiled with charcoal, filtered and, after the addition of sodium hydroxide, ether extracted. Upon evaporation of the ether from the extract, 8 grams of a reaction product were obtained, which, when purified by vacuum distillation at 6 mm. pressure and at a temperature up to 130° C., yielded 6.25 grams of a dark oil.

*Example II*

2,4-dimethyl-5-phenylthio thiazole

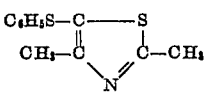
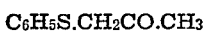

30 grams of phenylmercapto-acetone, $C_6H_5S.CH_2CO.CH_3$ prepared according to Autenrieth from sodium phenyl mercaptide and chloroacetone, were dissolved in 50 cc. of chloroform. To this solution were added, at a temperature below 5° C., 30 grams of bromine diluted with 30 cc. of chloroform. The reaction mixture was washed with water. The chloroform extract was dried with sodium sulfate and then evaporated. Upon the addition of 12 grams of thioacetamide to 38.5 grams of the brominated compound, a vigorous reaction took place. Treatment of the reaction mixture with sodium hydroxide and extraction with ether yielded 26 grams of a crude azole, which was dissolved in strong hydrochloric acid. The acid solution was extracted with ether, boiled with charcoal, neutralized with ammonia, and again ether extracted. The purified azole was obtained by ether extraction.

*Example III*

2,4-dimethyl-5-benzothiazolylmercapto thiazole

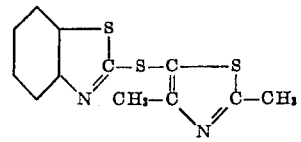

To a solution of 4.5 grams of sodium hydroxide in 45 cc. of methanol was added with stirring 15 grams of 2-mercapto benzothiazole. The mixture was filtered to remove undissolved material and 8 grams of chloroacetone added. The sodium chloride formed during the reaction was removed by filtration and the solution concentrated by removal of the solvent.

2-acetonyl-mercaptobenzothiazole separated and was recovered as a yellow crystalline product melting at 57° C., and having the following formula:

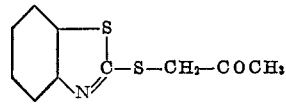

17 grams of this 2-acetonyl-mercaptobenzothiazole was dissolved in 50 cc. of chloroform. To this solution 14 grams of bromine diluted with 20 cc. of chloroform was added at a temperature ranging between 5 and 7° C. A crystalline yellow salt of the following formula separated out:

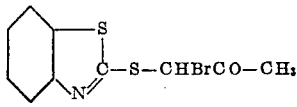

The solid yellow product was recovered by filtration and washed several times with chloroform and then finally dried. The filtrate from the reaction mixture was concentrated by evaporation and a tarry residue obtained. Both the crystalline yellow product and tarry residue were separately heated on a steam bath with an equimolecular quantity of thioacetamide. After treatment with sodium hydroxide and extraction with ether, a dark syrup of an intense azole odor was obtained.

*Example IV*

2-methyl-4-phenyl-5-ethylmercapto thiazole

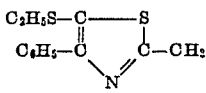

To 50 cc. of methanol, containing 2.3 grams of sodium, 6.2 grams of ethyl mercaptan and then 19.9 grams of phenacyl bromide were added with stirring. A reaction ensued which was indicated by the development of heat and the separation of sodium chloride. After standing for three hours at room temperature the reaction mixture was filtered and the filtrate evaporated to dryness. Extraction of the residue with a mixture of chloroform and methylene chloride yielded 15 grams of ω-ethylmercapto acetophenone.

The ethylmercapto acetophenone thus obtained was dissolved in 50 cc. of chloroform and cooled to a temperature below 5° C. A mixture of 30 cc. of methylene chloride and 13 grams of bromine was added with stirring. The solvents were evaporated and the residue extracted with ether and washed with water. The brominated ethylmercapto-acetophenone, 18 grams of a fuming liquid, reacted readily with 5 grams of thioacetamide as indicated by the development of heat. After heating on a steam bath for ½ hour, the reaction product was treated with an excess of aqueous sodium hydroxide solution and extracted with ether. The base was purified by extraction as hydrochloride, washing of the acid solution with ether and liberation with alkali, as described in the preceding examples. It was recovered as a brown-yellow oil having a typical azole odor.

*Example V*

2-amino-4-phenyl-5-phenylmercapto-thiazole

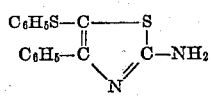

12.3 grams of brominated phenylthio-acetophenone, prepared according to the Autenrieth procedure, were mixed with 3.3 grams of thiourea and the mixture warmed on the steam bath. A vigorous reaction occurred. The material solidified on cooling. It was dissolved in hot methanol and neutralized with a little aqueous ammonia. On cooling a greenish solid separated, which after crystallization from benzene with charcoal formed 4.5 grams of a white crystalline powder, melting at 183–4° C.

*Example VI*

2-methyl-4-phenyl-5-phenoxy-thiazole

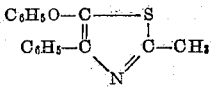

Phenoxy-acetophenone, $C_6H_5O-CH_2-CO-C_6H_5$ was prepared by adding 50 grams of phenacyl bromide in portions, with shaking, to 24 grams of phenol dissolved in 40 cc. of 6N sodium hydroxide. Agitation was continued for one hour. The liquid was decanted, the semi-solid ketone washed with water and crystallized from alcohol.

The ketone was brominated by dissolving 10.6 grams of it in 80 cc. of dry benzene and 50 cc. of dry ether in a flask equipped with stirrer, reflux condenser, and dropping funnel. After addition of a few crystals of anhydrous aluminum chloride, 8 grams of bromine diluted with 10–15 cc. of chloroform was added dropwise, and the temperature kept below 5° C. by cooling in an ice bath.

The brominated phenoxy-acetophenone as obtained by evaporation of the solvents in vacuo was taken up in about 150 cc. of dry ether in a flask equipped with reflux condenser and stirrer. To the boiling solution 7.6 grams of thioacetamide was added in portions. The thiazole hydrobromide precipitated after a short while and after refluxing for one hour was decomposed by the addition of water. An oil separated which was extracted with ether, dried with sodium sulfate and concentrated in vacuo. The thiazole separated as a white solid melting after recrystallization from alcohol at 154–5° C.

The above thio-ether substituted thiazoles and selenazoles, which contain a methyl or amino group in 2-position, readily form quaternary ammonium salts with methyl iodide, methyl-p-toluene sulfonate, etc., and undergo a condensation reaction with any of the known heterocyclic nitrogenous bases or quaternary salts thereof to form the dyes. Those compounds wherein the substituent in 2 position is an alkyl group higher than ethyl or is an aralkyl or heterocyclic group, can be effectively employed as intermediates for organic synthesis such as in the preparation of color-formers, filter dyes, and the like.

While the present invention has been described in considerable detail with respect to certain preferred procedures, materials and uses, it is understood that the new class of thio-ether substituted thia- and selenazoles and their uses as intermediates in organic synthesis is not limited thereto, and that numerous variations and modifications may be made. For instance, a compound having the formula:

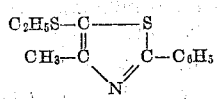

is obtained when monobromo-ethylmercapto-acetone is condensed with thiobenzamide. A compound having the formula:

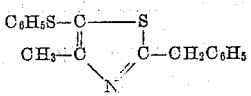

is obtained when monobromo-phenylmercapto-acetone is condensed with phenyl thioacetamide. A compound having the formula:

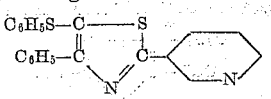

is obtained when monobromo-phenylthio-acetophenone is condensed with nicotinic thioamide. All such modifications and variations are within the scope of the invention as defined by the appended claims.

I claim:

1. A compound of the general formula:

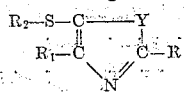

wherein R represents a member selected from the class consisting of amino, alkyl, aryl and aralkyl groups, $R_1$ and $R_2$ represent a member selected from the class consisting of alkyl, aryl and aralkyl groups, and Y is a member selected from the class consisting of sulfur and selenium.

2. A compound of the following formula:

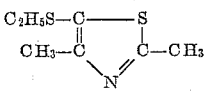

3. A compound of the following formula:

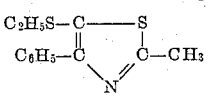

4. A process for producing a compound characterized by the following general formula:

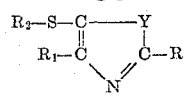

which comprises condensing a compound of the general formula:

with a compound of the general formula:

wherein R is a member selected from the group consisting of amino, alkyl, aryl and aralkyl groups, $R_1$ and $R_2$ represent a member selected from the class consisting of alkyl, aryl and aralkyl groups, X represents a member selected from the class consisting of chlorine, bromine and iodine, and Y is a member selected from the group consisting of sulfur and selenium.

5. A process for producing a compound having the following formula:

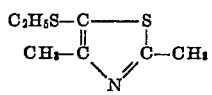

which comprises condensing 1 mol of ethylmercapto-bromoacetone with 1 mol of thioacetamide.

6. A process for producing a compound having the following formula:

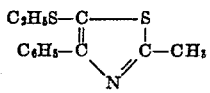

which comprises condensing 1 mol of bromoethylmercapto-acetophenone with 1 mol of thioacetamide.

7. A compound of the following formula:

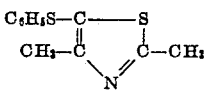

8. A compound of the following formula:

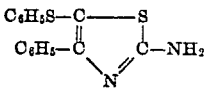

9. A compound of the following formula:

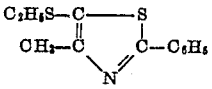

10. A process for producing a compound having the following formula:

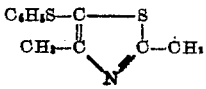

which comprises condensing 1 mol of monobromo phenylmercapto-acetone with 1 mol of thioacetamide.

11. A process for producing a compound having the following formula:

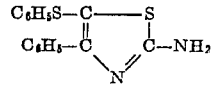

which comprises condensing 1 mol of monobromophenylthioacetophenone with 1 mol of thiourea.

12. A process for producing a compound having the following formula:

$$C_2H_5S-C-S$$
$$CH_3-C\quad C-C_6H_5$$
$$\diagdown N \diagup$$

which comprises condensing 1 mol of monobromoethylmercaptoacetone with 1 mol of thiobenzamide.

GUSTAV A. WIESEHAHN.

REFERENCES CITED

The following references are of record in the file of this patent:

UNITED STATES PATENTS

| Number | Name | Date |
|---|---|---|
| 2,423,709 | Knott | July 8, 1947 |

FOREIGN PATENTS

| Number | Country | Date |
|---|---|---|
| 204,691 | Switzerland | May 15, 1939 |